Sept. 22, 1936.  E. R. EVANS  2,054,796
RETURN SPRING CONSTRUCTION FOR MOTOR VEHICLE POWER UNITS
Filed Oct. 25, 1934
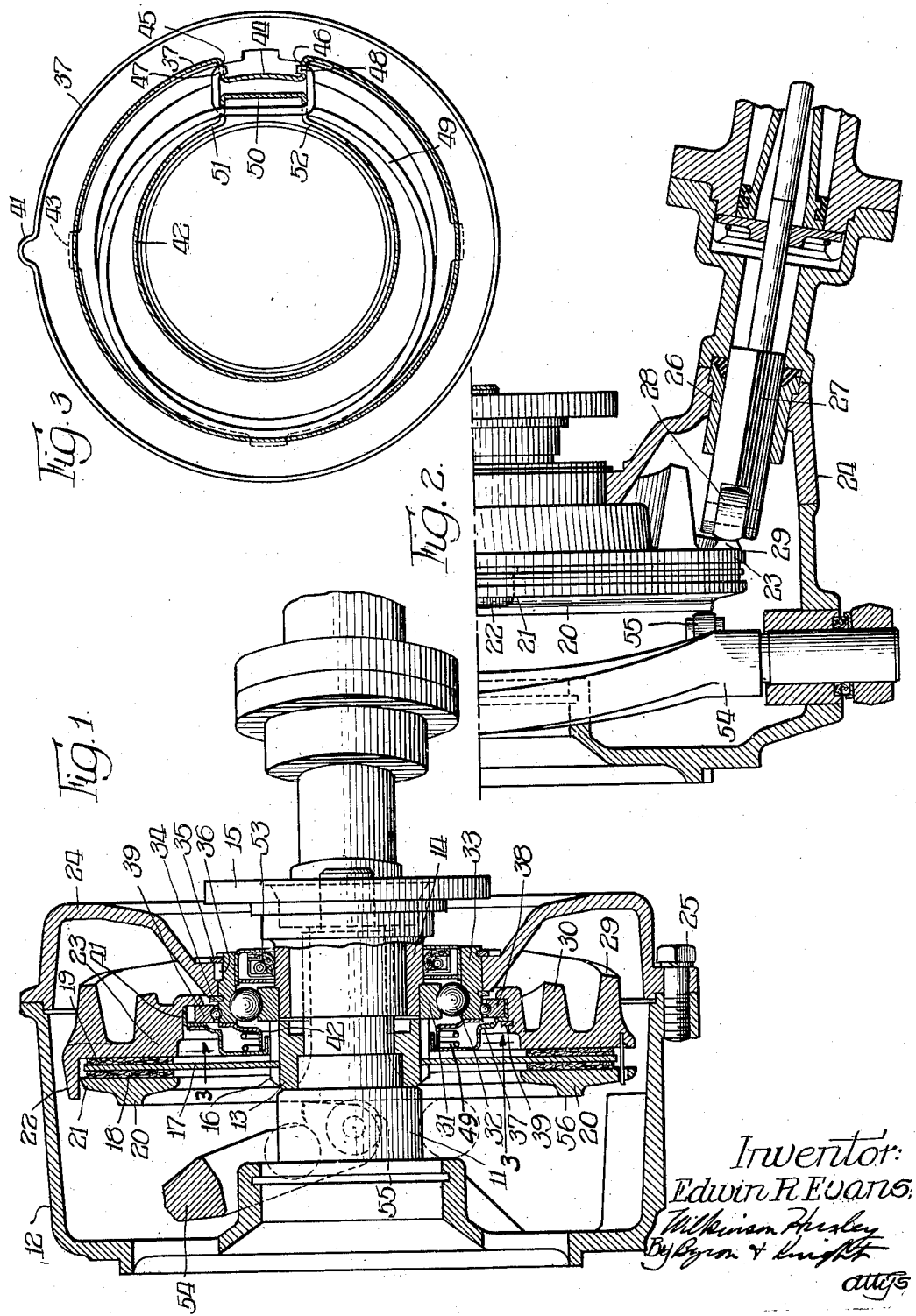
Inventor:
Edwin R. Evans, Patented Sept. 22, 1936

2,054,796

UNITED STATES PATENT OFFICE 2,054,796

RETURN SPRING CONSTRUCTION FOR MOTOR VEHICLE POWER UNITS

Edwin R. Evans, Cleveland, Ohio

Application October 25, 1934, Serial No. 749,943

8 Claims. (Cl. 188—140)

This invention relates to a new and improved power unit and more particularly to a return spring construction for use in such units for the purpose of returning the parts to zero or normal position.

While the power unit disclosed is particularly applicable to motor vehicles and to the controlled operation of brakes upon such vehicles, it is also adapted for other uses. The device may be used on a motor vehicle to actuate some device other than the brakes, as, for example, a clutch. It may also be used with rotating shafts other than those of a vehicle for the purpose of selectively and controllably changing the rotary shaft movement to a linear thrust or pull.

The invention relates to the type of power device in which a slipping clutch is used to clutch a movable plate to the rotating shaft, the movement of the plate serving through a cam action to apply power in a linear direction. In such devices it is important that the movable plate be restored to an exact normal position which is a neutral or zero position as regards the application of power.

It is an object of the present invention to provide a new and improved return device for power units and the like.

It is a further object to provide a construction in which the parts are definitely located in relation to each other and are returned to this exact location upon release from the power operation.

It is an additional object to provide a return device which is independent of the normal operating reactions of the power device.

It is also an object to provide a return device which functions in the same manner and with equal efficiency with the power device operated in either direction.

It is a further object to provide a double acting return device of this character, the operating part of which comprises a single coil spring.

It is an additional object to provide a construction in which the return spring is housed and in which the housing also acts to transmit thrusts to and from the spring.

It is also an object to provide a construction which is simple in design, composed of but few parts and readily assembled, and which is adapted for commercial production and use.

Other and further objects will appear as the description proceeds.

I have shown a preferred embodiment of my invention in the accompanying drawing in which—

Figure 1 is a vertical section through a power unit equipped with my improved return spring;

Figure 2 is a half horizontal section of the unit shown in Figure 1, with certain parts shown in elevation; and Figure 3 is a section taken on line 3—3 of Figure 1.

In the drawing the drive shaft 11 extends into the fixed power unit casing 12 from a forward element of the drive assembly, such as a transmission or free wheeling unit casing (not shown). The sleeves 13 and 14 are keyed to the shaft 11, the sleeve 14 having the flange 15 for connection to the propeller shaft of the vehicle (not shown).

The sleeve 13 is provided with splines 16 upon which is fitted the friction drive disc 17 which is shown as carrying the friction facings 18 and 19. The input plate 20 is notched as shown at 21 to receive the axially extending lugs 22 formed on the cam plate 23. The assembly is enclosed by the cover plate 24 which is secured to the housing 12 by the bolts 25. As best shown in Figure 2 this fixed cover plate 24 carries the sleeve 26 into which is slidably fitted the plunger 27 which carries the roller 28 engaging the cam surface 29 on the cam plate 23. The cam plate 23 is also provided with a second cam surface 30 adapted to engage a second plunger similar to plunger 27 and located substantially 180° opposite the plunger 27. The plunger 27 and the similar opposite plunger may be used to actuate any type of vehicle brakes in any desired manner, the brakes and brake linkage forming no part of the present invention. The device may be used with the brake linkages of my prior application Serial No. 719,913 filed April 10, 1934. The power device may also operate other devices than brakes.

The inner ball race 31 is supported on the sleeve 14 and serves to engage the series of large balls 32 which are held upon the raceway formed in sleeve 14 by the intermediate bearing race 33. The race 33 is secured to the cover plate 24 by rings 34 and 35 and is exactly located and held against rotation by the pin 36. The outer stamping 37 for securing and housing the return spring is gripped between the outer bearing member 38 and the cam plate 23, the stamping and bearing member being held in the cam plate by the ring 39. The outer stamping 37 is located relative to the cam plate and the bearing 38 and both are held against rotation in the cam plate 23 by the outwardly extended portion 41 on the stamping.

The inner stamping 42 is provided with lugs 43, shown in Figure 3, which fit in slots in the intermediate bearing 33 so as to locate the stamping 42 and to maintain it in position. Also as shown in Figure 3, the outer stamping is provided with a depressed portion 44 with openings 45 and 46 at each side to receive the ends 47 and 48 of the return spring 49. Opposite the portion 44 of the stamping 37, the inner stamping 42 is provided with a radially extended portion 50 and the openings 51 and 52 adjacent its ends, through which pass the portions of the spring 49.

The packing assembly 53 is located between the intermediate bearing race 33 and the sleeve 14 and serves to prevent loss of lubricant from the housing and the entry of foreign matter into the housing.

The rock shaft 54 carries thrust rollers 55 bearing against the track 56 on the input plate 20. These rollers may be of any desired form and the track may be hardened or chilled to minimize wear.

In operation of the device, the shaft 11 will be rotated when the motor vehicle, upon which the device is located, is moving either forward or backward. This shaft section is directly connected to the propeller shaft of the vehicle and is not dependent for rotation upon the engine of the vehicle but upon the actual movement of the vehicle. It will rotate in opposite directions when the vehicle is moving forward and backward.

The power device is brought in operation by pressure upon a brake pedal which may be of any desired form and which is not shown. This pressure will serve to rock the shaft 54 and press the rollers 55 against the track 56. This pressure thrusts the input plate 20 to the right, as seen in Figure 1, and causes it to engage the friction facing 18 on the friction disc 17. It will be understood that the input plate 20 being supported from the cam plate 23, which is in turn supported from the fixed housing 24, will normally be stationary and will not rotate with the shaft 11. The friction disc 17 is splined to the shaft through the sleeve 13 and will always rotate with the shaft. Consequently when the plate 20 is pressed against the friction facing 18 it will be caused by frictional engagement to rotate with the disc 17. This pressure against input plate 20 will also force the friction disc 17 to the right, causing the facing 19 to engage the cam plate 23. The input plate 20 and cam plate 23 are caused to rotate together by the interlocking lug 22 and recess 21 and both will be frictionally driven by their contact with the respective facings on the friction disc 17. The contact with the friction facings, however, serves not as a positive clutch but as a slipping clutch connection, and the input plate and cam plate do not rotate continuously with the shaft but are merely given a rotary displacement by this slipping clutch action. This rotary displacement is resisted by the thrust of the cams 29 and 30 against their respective rollers, such as the roller 28 shown in Figure 2, and the resistance of the brake actuating mechanism or other mechanism which will be operated by movement of the plungers, such as the plunger 27 shown in Figure 2.

The return spring 49 will have its ends displaced apart with a consequent tightening of the coils, regardless of the direction of rotation of the cam plate 23. This will be apparent from consideration of Figure 3. For example, as shown in Figure 3, the inner part 42 of the housing always remains stationary since it is secured to the intermediate ball race 33, which in turn is fixedly secured to the fixed housing 24. The part 37 of the return spring housing will rotate with the cam plate 23. If the cam plate, and consequently the housing part 37, moves in the clockwise direction as seen in Figure 3, the end 48 of the spring 49 will be moved in the clockwise direction by its engagement at 46 with the depressed portion 44 of the outer housing part 37. This rotation of the housing part 37 will move the depressed portion 44 of the housing and the opening 45 away from the end 47 of the spring 49, but this portion of the spring will be restrained against movement by its contact with the outwardly extended portion 50 of the inner housing member 42.

Upon release of the frictional drive which has caused the displacement of the cam plate, the power stored in the coil spring 49 will immediately return the parts to the position shown in Figure 3. It will be apparent that counterclockwise movement of the outer part 37 of the housing member will be similarly resisted by this spring, which thus serves to return the cam plate 23 to zero position regardless of the direction of rotation of the plate.

The return spring 49 may be made of different sizes of metal and of different strengths, depending upon the size and weight of the parts controlled by the spring. I have found, however, that in a construction of normal size for use in motor vehicles, a suitable spring is one which will have an initial tension of four pounds when in normal position, and will have a tension of twelve pounds when rotated 180° in either direction.

In assembling the parts the inner stamping or housing part 42 is secured to the intermediate ball race 33 and held from turning by the four lugs 43, shown in Figure 3. These lugs fit in milled grooves in the intermediate bearing race 33. The spring is then threaded through the stamped out openings 51 and 52 in the inner member 42, these being made sufficiently long so that one end of the spring can be threaded in, the spring wound up and the end passed through a second time. The ends finally drop into place on the two stampings, as clearly shown in Figure 3. The outer stamping or return spring housing 37 is gripped between the cam plate 23 and the outer ball race 39 and is held against turning by the raised portion 41 of the member 37. It is important that the stampings be assembled at exactly the proper points on the intermediate ball race 33 and the cam plate 23, and this accurate assembly is assured by the pin 36 which definitely locates the intermediate ball race on the housing and by the lugs 43 on the inner housing member 42 and the corresponding slots on the ball race 33. The proper location of the outer housing member 37 is assured by the raised portion 41 and the corresponding recess in the cam plate 23. This accurate location will insure a return of the parts to the point such that the roller 28 and the corresponding roller on the other side of the unit will be returned to the bottom of the cam grooves with the cam plate at zero position.

It will be understood that the type of return spring which has been disclosed will be applicable to other forms of construction and is not dependent for its operation or its efficiency upon the particular configuration of the cam plate or the cams thereon, or the character of the brakes or other device operated by parts reacting against the cams. Also the number of cams on the cam plate may obviously be varied. The particular character of the drive which serves to rotate the cam plate in one direction or the other has also no bearing on the efficiency of the return assembly, as different types of input plates and friction drive devices may be used without modification of the improved return spring assembly. I therefore contemplate such changes and modifications as come within the spirit and scope of the appended claims.

I claim:

1. In a power unit for motor vehicles, a fixed housing, a driven shaft in said housing, a friction disc driven by said shaft, an input plate and a cam plate located upon opposite sides of the friction disc, the cam plate being supported upon the fixed housing, means for forcing the input plate against the friction disc to cause the disc to engage the cam plate and cause that plate to rotate in the direction of rotation of the driven shaft, and means connecting the cam plate and fixed housing for restoring the cam plate to normal position.

2. In a power unit for motor vehicles, a fixed housing, a driven shaft in said housing, a friction disc driven by said shaft, an input plate and a cam plate located upon opposite sides of the friction disc, the cam plate being supported upon the fixed housing, means for forcing the input plate against the friction disc to cause the disc to engage the cam plate and cause that plate to rotate in the direction of rotation of the driven shaft, and a coil spring connecting the cam plate and fixed housing for restoring the cam plate to normal position.

3. In a power unit for motor vehicles, a fixed housing, a driven shaft in said housing, a friction disc driven by said shaft, an input plate and a cam plate located upon opposite sides of the friction disc, the cam plate being supported upon the fixed housing, means for forcing the input plate against the friction disc to cause the disc to engage the cam plate and cause that plate to rotate in the direction of rotation of the driven shaft, a two part spring housing, one part of said housing being secured to the fixed housing and the other part being secured to the cam plate, and a spring within the housing having ends engaging both housing parts and serving to return the cam plate to normal position when released from engagement with the friction disc.

4. In a power unit for motor vehicles, a fixed housing, a driven shaft in said housing, a friction disc driven by said shaft, an input plate and a cam plate located upon opposite sides of the friction disc, the cam plate being supported upon the fixed housing, means for forcing the input plate against the friction disc to cause the disc to engage the cam plate and cause that plate to rotate in the direction of rotation of the driven shaft, a two part spring housing, one part of said housing being secured to the fixed housing and the other part being secured to the cam plate, and a spring within the housing having two ends, each end engaging each housing part, the spring serving to return the cam plate to normal position from displacement in either direction, when released from engagement with the friction disc.

5. In a power unit for motor vehicles, a fixed housing, a driven shaft extending through said housing, a friction disc carried by said shaft and rotatable therewith, circular input and cam plates located upon opposite sides of the friction disc and supported by the fixed housing, means for causing engagement between the input and cam plates and the friction disc to cause said input and cam plates to be rotated by the driven shaft through the friction disc, a two part return spring housing located between the cam plate and shaft, one part of said housing being secured to the fixed housing, the other part of the housing being carried by the cam plate, and a return spring in said housing adapted to return the cam plate to normal position.

6. In a power unit for motor vehicles, a fixed housing, a driven shaft extending through said housing, a friction disc carried by said shaft and rotatable therewith, circular input and cam plates located upon opposite sides of the friction disc and supported by the fixed housing, means for causing engagement between the input and cam plates and the friction disc to cause said input and cam plates to be rotated by the driven shaft through the friction disc, a two part return spring housing located between the cam plate and shaft, one part of said housing being secured to the fixed housing, the other part of the housing being carried by the cam plate, and a coiled return spring in said housing adapted to return the cam plate to normal position, said housing and spring encircling the driven shaft.

7. In a power unit for motor vehicles, a fixed housing, a driven shaft extending through said housing, a friction disc carried by said shaft and rotatable therewith, circular input and cam plates located upon opposite sides of the friction disc and supported by the fixed housing, means for causing engagement between the input and cam plates and the friction disc to cause said input and cam plates to be rotated by the driven shaft through the friction disc, a coiled return spring, a two part return spring housing located between the cam plate and shaft, one part of said housing being secured to the fixed housing, the other part of the housing being carried by the cam plate, the housing parts having portions extending adjacent each other for engagement by the return spring, and the coiled return spring in said housing having hooked ends, each end engaging one side of the adjacent portions of the two housing parts, whereby the spring serves to return the cam plate to normal position from displacement in either direction.

8. In a power unit for motor vehicles, a fixed housing, a driven shaft extending through said housing, a friction disc carried by said shaft and rotatable therewith, circular input and cam plates located upon opposite sides of the friction disc and supported by the fixed housing, means for causing engagement between the input and cam plates and the friction disc to cause said input and cam plates to be rotated by the driven shaft through the friction disc, a coiled return spring, a two part return spring housing located between the cam plate and shaft, one part of said housing being secured to the fixed housing, the other part of the housing being carried by the cam plate, the housing parts having portions extending adjacent each other for engagement by the return spring, openings in the housing near the adjacent portions of the two parts whereby the coiled return spring may be threaded into the housing, and the coiled return spring in said housing having hooked ends, each end engaging one side of the adjacent portions of the two housing parts, whereby the spring serves to return the cam plate to normal position from displacement in either direction.

EDWIN R. EVANS.